United States Patent
Kakizaki et al.

[11] 3,856,195
[45] Dec. 24, 1974

[54] MOTOR VEHICLE ODOMETER SYSTEM
[75] Inventors: Tadao Kakizaki; Yoshiro Ichimaru, both of Yokohama; Ryozo Arai, Sagamihara, all of Japan
[73] Assignee: Nissan Motor Company, Limited, Yokohama, Japan
[22] Filed: Nov. 21, 1973
[21] Appl. No.: 417,784

[30] Foreign Application Priority Data
Dec. 7, 1972  Japan.......................... 47-140847

[52] U.S. Cl. .................. 235/97, 235/132 E
[51] Int. Cl. ...................... G01c 22/00, G06f 15/18
[58] Field of Search .......... 235/97, 96, 95 R, 132 E

[56] References Cited
UNITED STATES PATENTS
2,775,406  12/1956  Rodanet............................ 235/97
3,054,558  9/1962  Freuchtel......................... 235/95 R
3,226,021  12/1965  Dusinberre et al. ................. 235/96

Primary Examiner—Stephen J. Tomsky
Attorney, Agent, or Firm—Robert E. Burns; Emmanuel J. Lobato; Bruce L. Adams

[57] ABSTRACT

An auxiliary odometer driven electrically from a total odometer is manually set to show a distance between scheduled vehicle inspection and maintenance services. A cam wheel is adjustably attached to the last digit figure wheel such that when this figure wheel is turned to indicate the last or most significant digit of the distance, the attached cam wheel closes a switch in a circuit to generate a positive visual or sound alarm. The auxiliary odometer is then reset to zero to begin counting the distance driven.

7 Claims, 5 Drawing Figures

MOTOR VEHICLE ODOMETER SYSTEM

The present invention relates in general to odometers for vehicles such as automobiles, trucks, buses and crawlers for various purposes and in particular to an odometer incorporating an auxiliary odometer for generating a signal calling the driver's attention to a given distance having been driven, at which the vehicle is due for scheduled inspection and/or maintenance.

Vehicle manufacturers issue detailed instructions to the vehicle driver regarding scheduled inspection and or maintenance intervals based on distances driven from the previous mileage at which the vehicle was serviced. A conventional "total" odometer provides only indication of accumulated driven distance. The driver is mentally burdened because he has to follow the running mileage from the conventional odometer trying to keep in mind the mileage at which the vehicle is due to be inspected and/or maintained. Furthermore, the driver may easily forget the scheduled service mileage with the result that the vehicle may later require costly repairs caused by lack of proper inspection and/or maintenance.

It is therefore a primary object of the present invention to provide an odometer system for a vehicle which generates an electric signal to produce a positive visual or sound alarm or warning calling the vehicle driver's attention to a distance having been driven at which the vehicle is due for regularly scheduled inspection and/or maintenance.

Another object of the invention is to provide an auxiliary odometer for producing an alarm or warning calling a vehicle driver's attention to a distance having been driven at which the vehicle is due for regularly scheduled inspection and/or maintenance, the auxiliary odometer being compact and readily installable in an existing odometer for a vehicle without any significant reconstruction or modification thereof.

A further object of the invention is to provide an auxiliary odometer for producing an alarm or warning calling a vehicle driver's attention to a distance having been driven at which the vehicle is due for regularly scheduled inspection and/or maintenance, the auxiliary odometer being readily installable in an existing odometer for a vehicle and replaceable if failed, without interferring with the operation of the total odometer even during driving the vehicle.

Further objects and advantages of the invention will become more apparent from the following description taken in conjunction with the accompanying drawings in which like parts are designated by like reference numerals.

Figure 1:
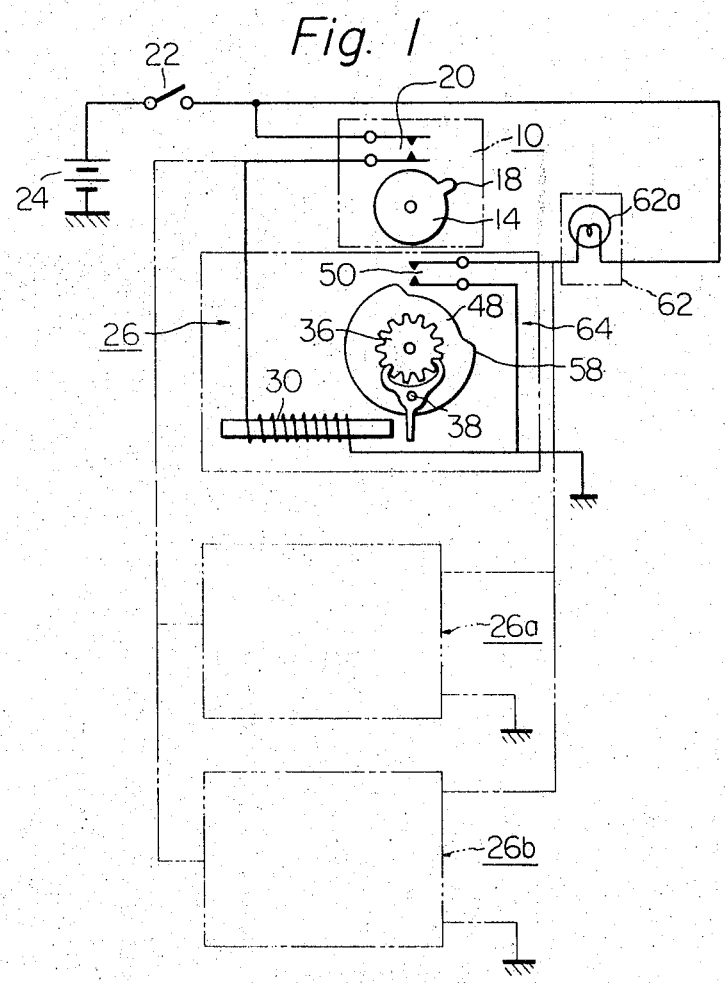
FIG. 1 is a schematic circuit diagram of a preferred embodiment of a vehicle odometer and an auxiliary odometer for producing an alarm or warning in accordance with the invention.
Figure 2:
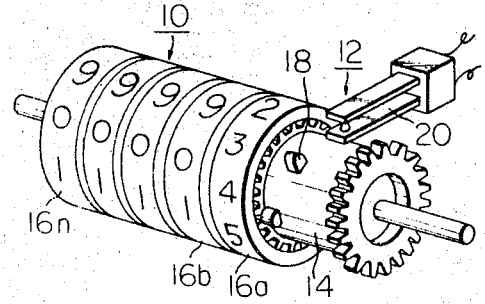
FIG. 2 is a perspective view of a vehicle odometer showing actuating elements for an auxiliary odometer in accordance with the invention.

Referring to the accompanying drawings and especially to FIGS. 1 and 2, there is shown conventional total odometer 10, which is usually located in the instrument panel of the vehicle, and a distance counter 12. Numeral 14 indicates a dummy wheel of the odometer, the dummy wheel being driven through a gear train from any suitable rotating member of the vehicle which rotates proportionally to the distance the vehicle is driven. Numerals 16a, 16b . . . 16n indicate figure wheels which rotate in dependence on the driven distance in a well known manner. The dummy wheel 14 has formed on its periphery a cam shaped projection 18. A contact or pressure switch 20 of the distance counter 12 is closed every time the projection 18 contacts it, as is clearly seen in FIG. 1. In this embodiment the gear train (not shown) is selected such that when the vehicle is driven one km, the dummy wheel 14 makes one complete revolution and thus the switch 20 closes once per every km traveled.

Figure 3:
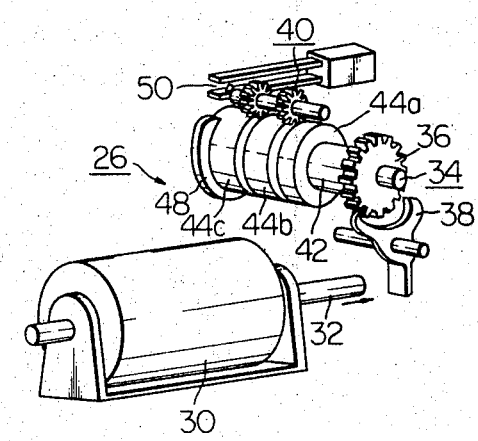
FIGS. 3 and 4 are perspective views of a preferred embodiment an auxiliary odometer in accordance with the invention.

In the illustrated embodiment a selectable driven distance counting circuit or auxiliary odometer 26 comprises a solenoid coil 30 and core 32 forming an electro-magnetic mechanism, and an advancing mechanism 34 for rotating a selected distance counting gearing 40 through a rotatable dummy wheel 42. The mechanism 34 may comprise (as shown in FIGS. 1 and 3) an escapement gear 36 rotatable stepwise by a rocking yoke 38 which responds to every protrusion of the core 32 caused by energization of the coil 30. The mechanism 34 may be of any construction, e.g. a ratchet mechanism, as long as it functions to rotate the gearing 40 in response to an energizing signal, which is produced by closing the switch 20 as described hereinabove, and which in the illustrated embodiment energizes the coil 30. The elements 30, 32, 34, 36, 38 and 40 form an electromechanic mechanism.

Figure 4:
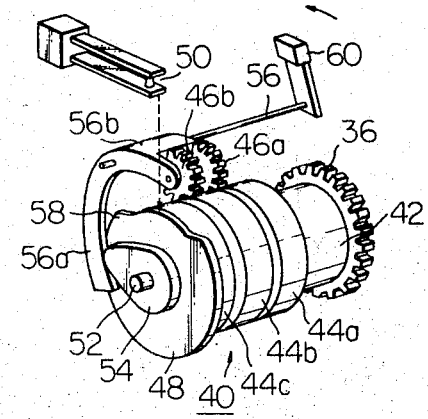
Figure 5:
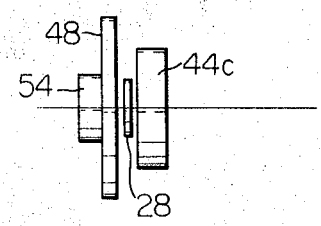
FIG. 5 is an elevation view of the preferred FIG. 3 and FIG. 4 embodiment of an auxiliary odometer showing schematically fastening means between two elements in accordance with the invention.

The auxiliary odometer 26 in the embodiment illustrated in FIGS. 3 and 4 is seen comprising three figure wheels 44a, 44b and 44c each representing a digit in a distance expressed in three figures, two pinion gears 46a and 46b, a cam wheel 48 with a cam 58, a contact or pressure switch 50 which is opened and closed by the cam wheel 48, a shaft 52 rotatably carrying the three wheels 44a, 44b and 44c, and a reset cam 54. A lever 56 is provided with an extension 56a abutting on the reset cam 54 and another extension 56b supporting a shaft (no numeral) carrying the pinion gears 46a and 46b. On the end opposite to the one with the extensions 56a and 56b there is a reset knob 60. The gearing 40 also includes pin gears and other elements forming a conventional odometer figure wheel advancing mechanism although not shown. Te cam wheel 48 may be adjustably fastened by suitable fastening means 28 to the third or last wheel 44c such that their angular relationship can be fixed as dictated by the selected third wheel most significant digit at which the cam 58 causes the switch 50 to close. The fastening means 28 may be e.g., a friction clutch, as schematically shown in FIG. 5.

Turning back to FIG. 1, it is seen that the pressure switch 50 is connected in series to an alarm or a warning device 62 (which in this illustrated embodiment is a lamp 62a), an ignition key 22 and a power source 24. When the cam wheel 48 is rotated to a position where the cam 58 closes the switch 50, an alarm or a warning circuit 64 is closed to, for example, sound an alarm or light the lamp 62a.

In operation, the selected travel distance between the required inspection and/or maintenance services is set into the auxiliary odometer 26 by first resetting it to zero with a push of the knob 60 in the direction of an arrow in FIG. 4. Assuming that the selected travel distance between scheduled inspection and/or maintenance services is 800 km, the numeral to be set into the counting gearing 40 is 800 − 1 = 799. Holding the dummy wheel 42 stationary, the wheel 44a is rotated to the position representing the digit 9. Holding the dummy wheel 42 and the wheel 44a stationary, the wheel 44b is then rotated to the position representing the digit 9. Holding the dummy wheel 42 and the wheels 44a and 44b stationary, the wheel 44c is rotated to the position representing the digit 7. Next, the cam wheel 48 is fastened by any fastening means 28 as described hereinbefore to the wheel 44c in such angular position that any further rotation of the wheel 44c would cause the cam wheel 48 to rotate such that the cam 58 of the cam wheel 48 would contact the switch 50 closing it and thus also the alarm or warning circuit 64. Finally, the auxiliary odometer 26 is reset to zero to begin a repeat distance counting. The time the alarm or warning device 62 is activated or energized depends on the configuration of the cam wheel 48 and can be suitably selected.

It should be noted, that the positions representing the digits 0 to 9 on the wheels 44a, 44b and 44c may be adjacently located such that the sectors they occupy are less than 36° as long as the number of teeth on the escapement gear 36 is coordinated with the angle of the digit sectors.

Furthermore, the alarm or warning circuit 62 may be connected to more than one auxiliary odometer as indicated at 26a and 26b in FIG. 1. The auxiliary odometers 26, 26a and 26b may be used to cause alarm or warning signals at different driven distances.

What is claimed is:

1. A motor vehicle odometer system including a total odometer and an auxiliary odometer for producing a positive alarm signal to call the vehicle driver's attention to the vehicle having been driven a selected distance at which the vehicle is due for regularly scheduled inspection and maintenance services, said total odometer comprising first electrical means to produce signals at intervals corresponding to unit distances driven; said auxiliary odometer comprising a plurality of figure wheels, a cam wheel adjustably attachable to the last figure wheel of said plurality of figure wheels, advancing means to advance said plurality of figure wheels in response to said signals, second electrical means to generate said positive alarm signal, said selected distance being preset on said auxiliary odometer which is thereafter reset, said cam wheel being attached at presetting on said last figure wheel such that when said last figure wheel is turned by said advancing means to the position representing the most significant digit of said selected distance said cam wheel turning therewith closes the circuit of said second electrical means to generate said alarm signal.

2. A system as claimed in claim 1, wherein said first electrical means comprises a pressure switch, a cam projection on a dummy wheel of said total odometer and rotating therewith to close said pressure switch once per revolution closing a circuit to produce said signals at intervals corresponding to unit distances driven.

3. A system as claimed in claim 2, wherein said advancing means includes an electro-mechanic mechanism comprising a solenoid the coil of which is responsive to said signals, a rocking yoke rockable by protrusions of the solenoid core resulting from responses of the coil, and an escapement gear responsive to rockings of said rocking yoke to cause said figure wheels to advance.

4. A system as claimed in claim 2, wherein said second electrical means comprises a pressure switch which is closed when a cam portion of said cam wheel applies pressure thereon, a lamp in said circuit of said second electrical means, said lamp being lighted to serve as said alarm signal when said pressure switch is closed.

5. A system as claimed in claim 1, further comprising two additional auxiliary odometers.

6. A system as claimed in claim 1, wherein said first and second electrical means are connected to a source of power through an ignition key.

7. A system as claimed in claim 1, further including resetting means for resetting said auxiliary odometer and comprising a pinion gear operatively disposed between each two adjacent figure wheels, a lever, a reset cam abutting on an extension of said lever, another extension of said lever arranged to support said pinion gear, a reset knob on said lever, and pushing said reset knob releases the pinion gear from its operative position and causes said reset cam to reset said auxiliary odometer.

* * * * *